June 14, 1966  G. G. GRUETTNER ET AL  3,255,653
TICKET MACHINES
Filed Oct. 18, 1963  3 Sheets-Sheet 1
FIG. 1a
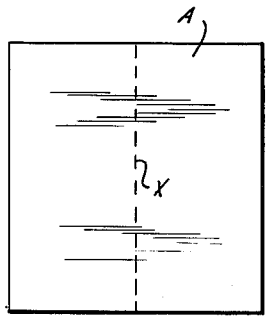
FIG. 1b
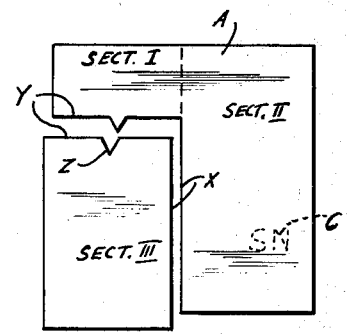
FIG. 1c
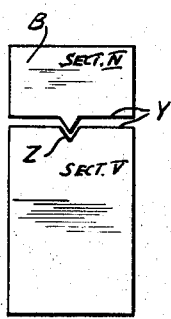
FIG. 3
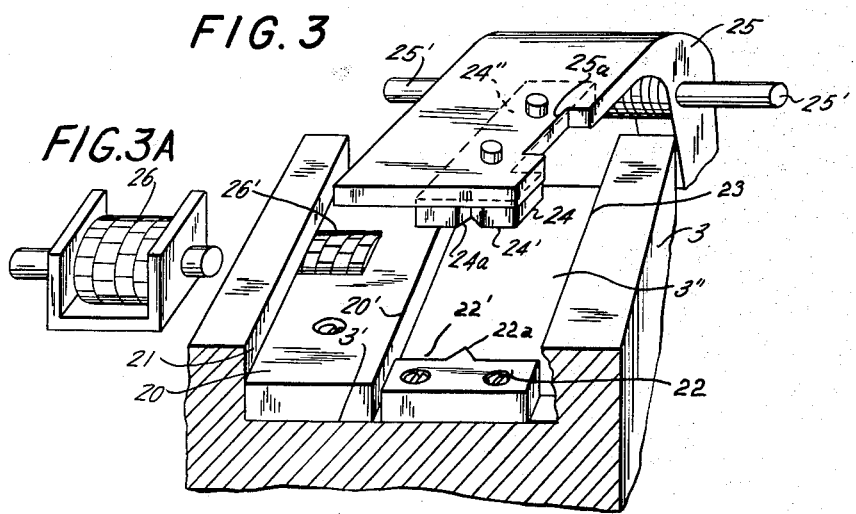
FIG. 3A
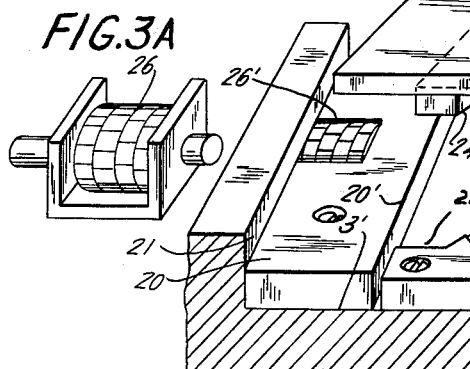
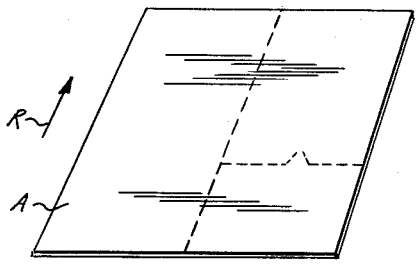
GERARD G. GRUETTNER
HANS BONHEIM
INVENTORS
BY

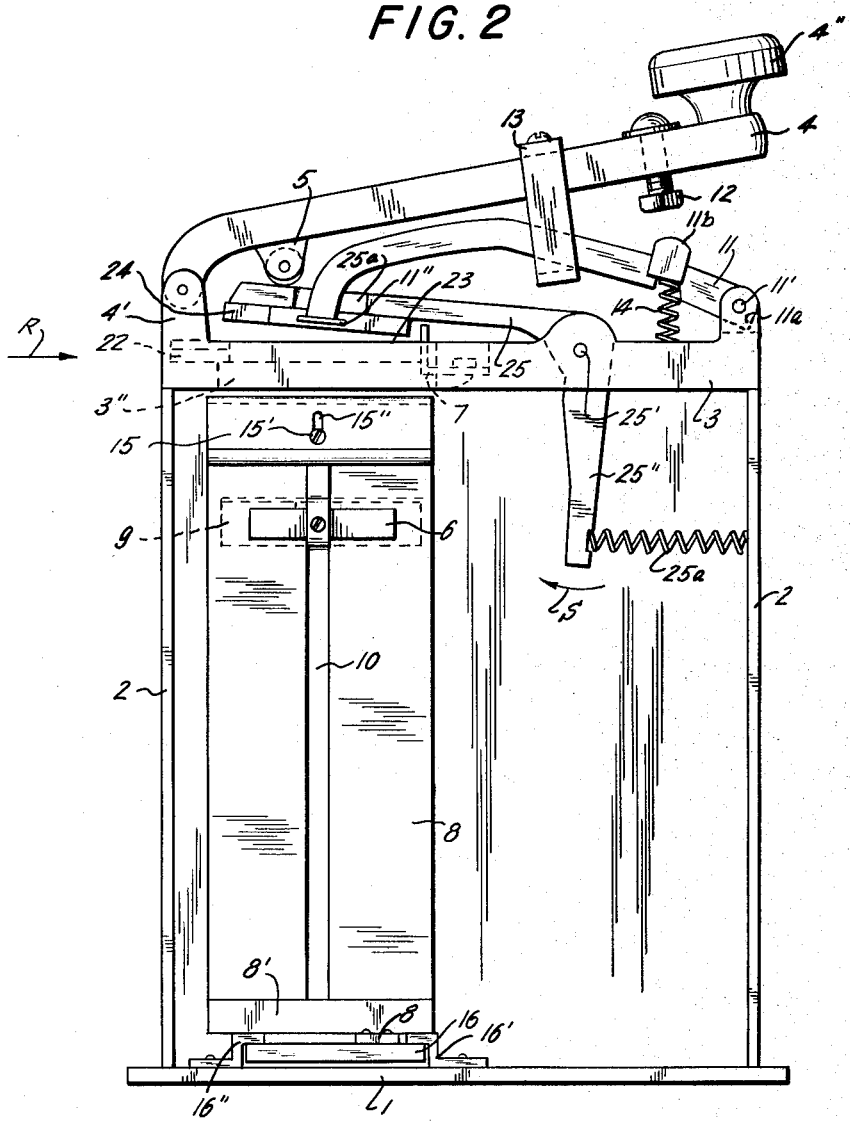

June 14, 1966 G. G. GRUETTNER ET AL 3,255,653
TICKET MACHINES
Filed Oct. 18, 1963 3 Sheets-Sheet 3
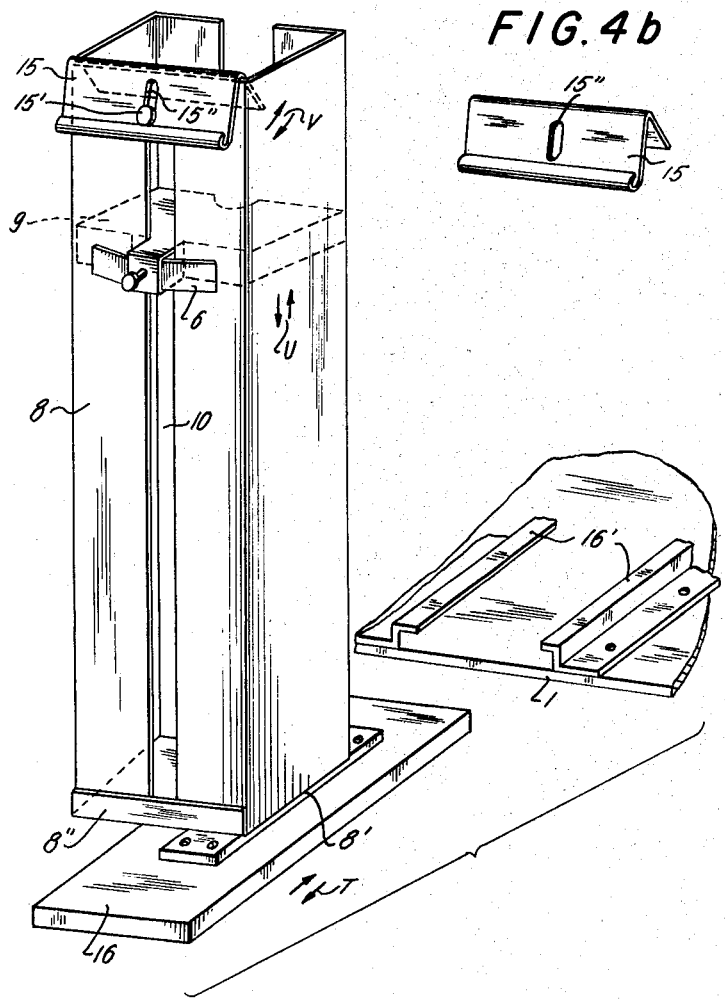
INVENTORS
GERARD G. GRUETTNER
HANS BONHEIM
BY 3,255,653
TICKET MACHINES
Gerard G. Gruettner, North Arlington, and Hans Bonheim, Fairlawn, N.J., assignors to Atlas Recording Machines Corporation, New York, N.Y., a corporation of New York
Filed Oct. 18, 1963, Ser. No. 317,171
4 Claims. (Cl. 83—96)

The present invention concerns a ticket machine, and more particularly a ticket machine for dividing tickets into two portions. The term ticket is intended to include price tags and similar items conventionally used in retail stores e.g. of the garment industry in connection with sales to individual customers in which case it is desirable to divide a price tag or ticket affixed to a piece of merchandise into two portions at the point of sale in such a manner that one portion may be kept as a record of an effected sale while the remainder or other portion of the tag or ticket remains, at least for the moment, attached to the piece of merchandise. It is particularly desirable that the cut off record portions of the tags or tickets representing consecutive sales are collected in an orderly manner in the consecutive order of the respective sales or transactions. A ticket machine of this type is of particular advantage in connection with the so-called Kimball ticket system.

It has been found that no machine exists that would be suitable for carrying out the cutting or "chopping" operation and the stacking of the cut off ticket portions in an entirely satisfactory and efficient manner.

It is therefore one important object of the invention to provide for a ticket machine of the general type set forth which, however, is free of the inconveniences and weaknesses encountered with other machines or devices known.

It is another object of the invention to provide for a ticket machine as mentioned above which is of a comparatively simple construction and entirely reliable in operation.

With above objects in view the invention includes a ticket machine for dividing tickets into two portions, comprising, in combination, a machine frame and cutting means mounted on that frame, said cutting means including stationary cutter means and movable cutter means. Either one of these cutter means includes or has a first cutting edge extending in one predetermined direction and a second cutting edge extending transversely of said one direction; thus, the cooperation of said first and second cutting edges of said stationary cutter means with the first and second cutting edges, respectively, of the movable cutter means effects a dividing of a ticket placed in a corresponding predetermined cutting position, when the movable cutter means are moved with their cutting edges past the cutting edges of the stationary cutter means. There are also guide means adjacent to the stationary cutter means for guiding a ticket to be cut on its travel to its desired cutting position while it is being inserted into the cutting means. Finally the machine comprises stacking means arranged in the machine frame underneath the cutting means for receiving and stacking consecutively after each cutting operation one of the portions into which tickets have been divided by consecutive cutting operations.

It will be shown that a ticket machine of this type is fully in line with the above objects of the invention. However, further objects and advantages of the invention will become apparent from the following description, given by way of example, of an embodiment of the invention with reference to the accompanying drawings, in which:

FIG. 1a illustrates a double ticket before its being cut;

FIG. 1b shows the same ticket after being divided into two portions;

FIG. 1c illustrates a single ticket divided into two portions;

FIG. 2 is a diagrammatic elevation of a ticket machine according to the invention;

FIG. 3 is a perspective view of a portion of the machine of FIG. 2 for showing certain details at a larger scale;

FIG. 3a is a perspective view of an element of the machine illustrated by FIGS. 2 and 3;

FIG. 4 is a perspective illustration of the stacker device of the machine according to FIG. 2;

FIG. 4a is a perspective view of a detail of the stacker device of FIG. 4; and

FIG. 4b is a perspective view of another detail of the stacker device.

Referring first to FIGS. 1a and 1b, it will be understood that one of the tasks of the ticket machine will be to divide a double ticket A along a longitudinal parting line $x$ and a transverse parting line $y$ whereby sections I and II of the original ticket A are separated from section or portion III which is intended to be used as a record of a sales or other transaction.

Sometimes reasons exist for using not double tickets A but single tickets B as shown by FIG. 1c. In this case the ticket B must be divided into sections IV and V by a cut along the parting line $y$. For obvious reasons it is of great importance to construct the ticket machine in such a manner that both types of tickets may be cut or divided as may be desired or required.

For security purposes a notch or notches of any desired shape may have to be produced along at least one of the cut edges, as e.g. the notch $z$. Similarly, an imprint or embossing C may have to be produced simultaneously with the cutting operation.

As can be seen from FIG. 2, the machine comprises a frame including a base plate 1, two side walls 2 and a top portion 3 having a substantially flat top surface 3′ and an elongated opening 3″ therein. The top platform 3 carries the cutting arrangement which in this embodiment includes a first cutting blade 20 with a cutting edge 20′ and a second blade 22 with a cutting edge 22′ extending transversely of edge 20′, both blades being mounted stationarily on the surface 3′ and surrounding, or slightly projecting over the boundary of, the opening 3″. For shearing cooperation with said cutting edges one movable cutter blade 24 with cutting edges 24′ and 24″ is attached to a cutter lever 25 tiltable about hinge pins 25′ in such a manner that when the cutter lever 25 is depressed from its illustrated normal position the cutter edge 24″ carries out a shearing action in cooperation with edge 20′, and similarly edge 24′ acts as a chopping cutter in cooperation with edge 22′.

If desired the edge 24′ may include a notch 24a of any desired shape and the edge 22′ may be provided with a corresponding projection 22a for producing the notch $z$ (FIGS. 1b and 1c) in the edge $y$ cut thereby.

The cutter lever 25 is pivotably supported on the frame top 3 by its hinge pins 25′ as shown in FIG. 2 and has an extension arm 25″ which is continuously biased in the direction of arrow S by a spring 25a interposed between arm 25″ and one of the walls 2.

For guiding the tickets to be divided into their proper cutting position guide means are provided. A first guiding edge 21 which may be integral with the top platform 3 and rises above the level of the cutter blade 20 extends parallel with the cutting edge 20′ and is spaced therefrom a distance equal to the width of the section II of ticket A (FIG. 1b). A similar guiding edge 23 is provided along the other side of the opening 3″ and rising above the level of the top of blade 22. It extends also parallel with the cutting edge 20' and is spaced therefrom a distance corresponding to the width of section III of ticket A (FIGS. 1a, 1b) or section V of ticket B (FIG. 1c). If a ticket A is to be placed in cutting position it will be guided on its path at both sides by the guiding edges 21 and 23. However, when a single ticket B is to be introduced an additional guiding edge is needed. This is provided by the fact that the top surface of the cutter blade 20 is at a level above the top surface of the blade 22 so that the actual cutting edge 20' together with the guiding edge 23 can act as a guide for the lateral edges of the ticket B. In both cases a stop 7 against which the short edge of the ticket will abut predetermines the correct position of any label in longitudinal direction.

In order to make it possible that an imprint or embossing C may be produced on the ticket simultaneously with the cutting operation the cutter blade 20 and the frame portion 3 therebeneath may be provided with a cutout of proper size 26' into which an adjustable embossing or printing chase or wheel assembly 26—shown separately by FIG. 3a—may be inserted. The printing or embossing is effected by a suitable pressure pad or projection coming down together with the cutting movement of lever 25 and forcing the ticket material against the device 26.

The downward or cutting movement of the cutter lever 25 is effected by an actuating lever 4 pivotally hinged between two lugs 4' at one end of the frame top 3 and carrying at its free end a handle or button 4''. Since the ticket must be introduced between the guide edges in direction R, i.e., between the lugs 4' the hinged end of the lever 4 acts most conveniently as a finger guard for the operator. The lever 4 carries at its lower side a pressure roller 5 which is always in operative engagement with the top of cutter lever 25 on account of the action of spring 25a. Thus a downward movement of actuating lever 4 results in the cutting movement of lever 25.

For stacking the cut off portions of tickets divided by the action of the above described cutting means a stacking arrangement is provided in the machine frame as shown in FIG. 2 and in greater detail in FIGS. 4, 4a, 4b. The stacker arrangement comprises mainly a chute 8 made up of two upright wall portions separated by at least one slot 10 and held together by at least one strip 8'' at the bottom end and a similar one (not shown) at the top end. Attached to the bottom end is a cross strip 8' and the latter is attached to a stacker base 16. This base 16 is so dimensioned that it can slide between cleats 16' on the frame base 1 in the directions of arrows T between an operative position in which the top opening of the chute 8 is underneath the opening 3'' and an inoperative or discharge position outside the frame.

Inside the chute 8 a platform 9 is arranged to be movable in vertical directions U, with flaps 9' sliding along the inside of the chute walls and a projection 9'' extending through the slot 10 outwardly. A friction producing blade spring 6 inserted between the projection 9'' and the outside of the chute walls will hold the platform frictionally in any position along said walls. It is evident that any ticket portion cut off by the cutting means will drop through the opening 3'' onto the platform 9 and thus a stack of consecutively cut off ticket portions will accumulate thereon.

However, since such cut ticket portions may have a tendency of turning or bending positive stacker means are provided in the following manner. It is to be assumed that at the beginning of operation the platform 9 is moved to its uppermost position so that a cut off ticket portion would have to drop only a very short distance and would be unlikely to turn. Every subsequent ticket portion is pushed downward immediately after being cut off by means of a pusher lever 11 which is pivoted to the frame top 3 at 11' and reaches with an angular end plate 11'' into the space immediately underneath the cutter lever 25 while clearing a notch 25a provided along the outer edge of the lever 25. The cutter lever 25 is urged into its illustrated idle position by a spring 14 supported by the frame top 3, the idle position being determined by a stop 11a. The pusher lever 11 is also moved by the movement of the actuating lever 4 but its pushing action is timed by means of a set screw 12 in lever 4 and engaging the button 11b in such a manner that the pusher end plate 11'' hits the topmost cut off ticket portion only after the cutting action is completed. In order to make doubly sure that the pusher end plate 11'' is out of the way of the next ticket to be inserted, a hook 13 is mounted on the lever 4 so as to reach under the pusher lever 11 and to pull it upward when the actuating lever 4 returns to its idle position.

In view of the above mentioned tendency of ticket portions to bend, curl or turn an additional safety device consists in a retaining flap 15 arranged at the upper edge of the chute 8. Essentially the flap 15 is a piece of material bent to angular shape as shown by FIG. 4b. It rides on the upper edge of the chute front walls and is prevented from shifting by a screw 15' loosely extending through an elongated hole 15''. The flap 15 is thus enabled to oscillate in the direction of the arrows V. By its own weight it will tend to assume the position shown in FIG. 4. Thus its inner flap portion will rest on top of the stack of ticket portions in the chute 8. When the end plate 11'' of the pusher 11 pushes a new ticket portion down into the chute, the flap 15 gives way to let that new ticket portion pass and returns into retaining position as soon as the pusher 11 moves back to idle position.

The operation of the ticket machine as described is extremely simple. A ticket A or B is pushed along the above described guides into cutting position i.e. up to a position in which its front edge hits the stop 7 and the actuating lever 4 is depressed by pushing down the knob 4''. As a result the respective ticket is divided into two portions one of which is stored or stacked in the chute 8 where all the cut off ticket portions then accumulate in exactly the sequence of the consecutive cutting operations. Whenever desired, or when the chute is filled, the chute 8 may be withdrawn from the machine frame and emptied.

While the described embodiment is designed for manual operation it would be still within the scope of the invention to replace the stop 7 by an end switch and to equip the machine with an electro-magnetic or electro-hydraulic or electro-pneumatic actuator for causing depression of the actuating lever 4 when the front edge of a ticket strikes the end switch located where stop 7 is shown in FIG. 2.

While a specific embodiment of a ticket machine according to the invention has been described and illustrated, it will be understood that various modifications within the spirit of the invention may occur to those skilled in the art. Therefore, it is intended that no limitations be placed on the invention except as defined by the scope of the appended claims.

What is claimed is:
1. In a ticket machine for dividing tickets into two portions, in combination,
   a machine frame having a substantially flat top surface portion including an opening therein;
   cutting means mounted on said machine frame and including flat stationary cutter means arranged on said flat top surface portion and having a first cutting edge extending in one predetermined direction and a second cutting edge extending transversely of said one direction at a level lower than that of said first cutting edge, both said cutting edges being located above marginal portions of said opening, respectively, movable cutter means cooperating with said stationary cutter means and having third and fourth cutting edges matching said first and second cutting edges, respectively, of said stationary cutter means for dividing a ticket into two predetermined portions when the same is placed in a corresponding predetermined cutting position and said movable cutter means are moved with their cutting edges past said edges of said stationary cutter means, and guide means adjacent to said stationary cutter means for guiding a ticket to be cut on its path into said cutting position while it is being inserted into said cutting means, said guide means including a first guiding edge located alongside said stationary cutter means substantially parallel with said first cutting edge and spaced a predetermined distance therefrom in one direction, and a second guiding edge substantially parallel with said first cutting edge and spaced a predetermined distance therefrom in opposite direction, so that a ticket having a width corresponding to the spacing between said first and second guiding edges is guided by said guiding edges into a cutting position for being cut by both said first and second cutting edges in cooperation with said third and fourth cutting edges, respectively, while a ticket having a width corresponding to the spacing between said first cutting edge and said second guiding edge is guided by said first cutting edge and said second guiding edge into a cutting position for being cut only by said second and fourth cutting edges; and stacking means arranged in said machine frame underneath said opening for receiving and stacking consecutively after each cutting operation one of the portions into which tickets have been divided by consecutive cutting operations.

2. In a ticket machine for dividing tickets into two portions, in combination, a machine frame having a substantially flat top surface portion including an opening therein;

cutting means mounted on said machine frame and including flat stationary cutter means arranged on said flat top surface portion and having a first cutting edge extending in one predetermined direction and a second cutting edge extending transversely of said one direction at a lower level than that of said first cutting edge, both said cutting edges being located above marginal portions of said opening, respectively, movable cutter means cooperating with said stationary cutter means and having third and fourth cutting edges matching said first and second cutting edges, respectively, of said stationary cutter means for dividing a ticket into two predetermined portions when the same is placed in a corresponding predetermined cutting position and said movable cutter means are moved with their cutting edges past said edges of said stationary cutter means, cutter lever means carrying said movable cutter means and being pivotally mounted on said machine frame, actuator lever means hingedly mounted on said machine frame and in operative engagement with said cutter lever means for causing, when moved in a predetermined direction from its normal idle position, said cutter lever means to effect a cutting operation by said movable cutter means, and guide means adjacent to said stationary cutter means for guiding a ticket to be cut on its path into said cutting position while it is being inserted into said cutting means, said guide means including a first guiding edge located alongside said stationary cutter means substantially parallel with said first cutting edge and spaced a predetermined distance therefrom in one direction, and a second guiding edge substantially parallel with said first cutting edge and spaced a predetermined distance therefrom in opposite direction, so that a ticket having a width corresponding to the spacing between said first and second guiding edges is guided by said guiding edges into a cutting position for being cut by both said first and second cutting edges in cooperation with said third and fourth cutting edges, respectively, while a ticket having a width corresponding to the spacing between said first cutting edge and said second guiding edge is guided by said first cutting edge and said second guiding edge into a cutting position for being cut only by said second and fourth cutting edges; and stacking means arranged in said machine frame underneath said opening for receiving and stacking consecutively after each cutting operation one of the portions into which tickets have been divided by consecutive cutting operations.

3. In a ticket machine for dividing tickets into two portions, in combination, a machine frame having a substantially flat top surface portion including an opening therein;

cutting means mounted on said machine frame and including flat stationary cutter means arranged on said flat top surface portion and having a first cutting edge extending in one predetermined direction and a second cutting edge extending transversely of said one direction at a lower level than that of said first cutting edge, both said cutting edges being located above marginal portions of said opening, respectively, movable cutter means cooperating with said stationary cutter means and having third and fourth cutting edges matching said first and second cutting edges, respectively, of said stationary cutter means for dividing a ticket into two predetermined portions when the same is placed in a corresponding predetermined cutting position and said movable cutter means are moved with their cutting edges past said edges of said stationary cutter means, cutter lever means carrying said movable cutter means and being pivotally mounted on said machine frame, actuator lever means hingedly mounted on said machine frame and in operative engagement with said cutter lever means for causing, when moved in a predetermined direction from its normal idle position, said cutter lever means to effect a cutting operation by said movable cutter means, and guide means adjacent to said stationary cutter means for guiding a ticket to be cut on its path into said cutting position while it is being inserted into said cutting means, said guide means including a first guiding edge located alongside said stationary cutter means substantially parallel with said first cutting edge and spaced a predetermined distance therefrom in one direction, and a second guiding edge substantially parallel with said first cutting edge and spaced a predetermined distance therefrom in opposite direction, so that a ticket having a width corresponding to the spacing between said first and second guiding edges is guided by said guiding edges into a cutting position for being cut by both said first and second cutting edges in cooperation with said third and fourth cutting edges, respectively, while a ticket having a width corresponding to the spacing between said first cutting edge and said second guiding edge is guided by said first cutting edge and said second guiding edge into a cutting position for being cut only by said second and fourth cutting edges; and stacking means arranged in said machine frame underneath said opening for receiving and stacking consecutively after each cutting operation one of the portions into which tickets have been divided by consecutive cutting operations, said stacking means including a vertical chute means open at its top end and being insertable into said machine frame as well as removable therefrom and including an inside platform member adapted to support cut ticket portions in stacked order and being movable in vertical direction within said chute means, and friction means for displaceably holding said platform member in any desired position along its vertical path in said chute means.

4. In a ticket machine for dividing tickets into two portions, in combination, a machine frame having a substantially flat top surface portion including an opening therein;

cutting means mounted on said machine frame and including flat stationary cutter means arranged on said flat top surface portion and having a first cutting edge extending in one predetermined direction and a second cutting edge extending transversely of said one direction at a lower level than that of said first cutting edge, both said cutting edges being located above marginal portions of said opening, respectively, movable cutter means cooperating with said stationary cutter means and having third and fourth cutting edges matching said first and second cutting edges, respectively, of said stationary cutter means for dividing a ticket into two predetermined portions when said ticket is placed in a corresponding predetermined cutting position and said movable cutter means are moved with their cutting edges past said edges of said stationary cutter means, cutter lever means carrying said movable cutter means and being pivotally mounted on said machine frame, actuator lever means hingedly mounted on said machine frame and in operative engagement with said cutter lever means for causing, when moved in a predetermined direction from its normal idle position, said cutter lever means to effect a cutting operation by said movable cutter means, and guide means adjacent to said stationary cutter means for guiding a ticket to be cut on its path into said cutting position while it is being inserted into said cutting means, said guide means including a first guiding edge located alongside said stationary cutter means substantially parallel with said first cutting edge and spaced a predetermined distance therefrom in one direction, and a second guiding edge substantially parallel with said first cutting edge and spaced a predetermined distance therefrom in opposite direction, so that a ticket having a width corresponding to the spacing between said first and second guiding edges is guided by said guiding edges into a cutting position for being cut by both said first and second cutting edges in cooperation with said third and fourth cutting edges, respectively, while a ticket having a width corresponding to the spacing between said first cutting edge and said second guiding edge is guided by said first cutting edge and said second guiding edge into a cutting position for being cut only by said second and fourth cutting edges; and stacking means arranged in said machine frame underneath said opening for receiving and stacking consecutively after each cutting operation one of the portions into which tickets have been divided by consecutive cutting operations, said stacking means including a vertical chute means open at its top end and being insertable into said machine frame as well as removable therefrom and including an inside platform member adapted to support cut ticket portions in stacked order and being movable in vertical direction within said chute means, and friction means for displaceably holding said platform member in any desired position along its vertical path in said chute means, said stacking means further comprising stacker lever means pivotably mounted on said machine frame and operatively connected with said actuator lever means for being moved in synchronism, but with slight delay, with each cutting operation from a normal idle position to a stacking position in which said stacker lever means transports a ticket portion severed from the other portion of a particular ticket from its cutting position into a stacked position on top of said platform member and on top of one or more of already cut similar portions if such ticket portions are already stacked on said platform member, so that said platform member is moved by each operative movement of said stacker lever a distance downward which corresponds substantially to the thickness of one ticket.

References Cited by the Examiner
UNITED STATES PATENTS

| | | | |
|---|---|---|---|
| 1,736,049 | 11/1929 | Nordendale | 83—440 |
| 1,874,816 | 8/1932 | Shipley | 83—167 X |
| 2,000,159 | 5/1935 | Bolognino | 83—167 |
| 2,144,564 | 1/1939 | Portman-Dixon | 83—95 |

WILLIAM W. DYER, JR., *Primary Examiner.*

WILLIAM S. LAWSON, *Examiner.*

F. T. YOST, *Assistant Examiner.*